US011229222B2

(12) United States Patent
Katz et al.

(10) Patent No.: US 11,229,222 B2
(45) Date of Patent: Jan. 25, 2022

(54) EGG PROTEIN PRODUCT

(75) Inventors: Michael Katz, Regina (CA); Naiyee Jay, Saskatoon (CA); Sara Lui, Saskatoon (CA); Dan Prefontaine, Saskatoon (CA)

(73) Assignee: Saskatchewan Egg Producers, Saskatchewan (CA)

( * ) Notice: Subject to any disclaimer, the term of this patent is extended or adjusted under 35 U.S.C. 154(b) by 931 days.

(21) Appl. No.: 12/314,387

(22) Filed: Dec. 9, 2008
(Under 37 CFR 1.47)

(65) Prior Publication Data
US 2009/0220674 A1 Sep. 3, 2009

Related U.S. Application Data

(63) Continuation-in-part of application No. PCT/CA2007/001961, filed on Nov. 1, 2007.

(30) Foreign Application Priority Data

Nov. 1, 2006 (CA) .................................. CA 2566763

(51) Int. Cl.
| A23J 1/08 | (2006.01) |
| A23J 3/26 | (2006.01) |
| A23J 3/22 | (2006.01) |
| A23L 15/00 | (2016.01) |

(52) U.S. Cl.
CPC ................. *A23J 3/26* (2013.01); *A23J 3/225* (2013.01); *A23L 15/00* (2016.08)

(58) Field of Classification Search
CPC ....................................................... A23J 1/08
USPC .... 426/518, 656, 512, 448, 330.1, 516, 558, 426/568, 613, 614, 549, 661
See application file for complete search history.

(56) References Cited

U.S. PATENT DOCUMENTS

| 3,814,824 | A |   | 6/1974  | Bedenk et al. |
| 4,338,340 | A |   | 7/1982  | Morimoto et al. |
| 4,418,086 | A |   | 11/1983 | Marino et al. |
| 4,517,204 | A | * | 5/1985  | Mottur et al. ................. 426/94 |
| 4,840,808 | A | * | 6/1989  | Lee et al. ....................... 426/270 |
| 5,034,232 | A |   | 7/1991  | Sugitani et al. |
| 5,124,168 | A | * | 6/1992  | McMillin et al. ............ 426/557 |
| 5,147,665 | A | * | 9/1992  | Furcsik ............................ 426/19 |
| 5,283,077 | A | * | 2/1994  | Ray ................................. 426/637 |
| 5,435,714 | A | * | 7/1995  | Van Lengerich et al. .... 425/313 |
| 5,639,485 | A | * | 6/1997  | Weinstein et al. ......... 425/131.1 |
| 5,922,387 | A | * | 7/1999  | Parada et al. ................. 426/557 |
| 5,989,620 | A | * | 11/1999 | Wang et al. ................... 426/634 |
| 6,016,742 | A | * | 1/2000  | Hauck et al. .................... 99/348 |
| 6,045,851 | A | * | 4/2000  | Cross ............................. 426/557 |
| 6,203,840 | B1 | * | 3/2001 | Meyer et al. ................. 426/557 |
| 6,596,331 | B1 | * | 7/2003 | Nobuyasu et al. ........... 426/557 |
| 7,235,276 | B2 |   | 6/2007 | Allen et al. |
| 7,597,921 | B2 |   | 10/2009 | Walsh et al. |
| 2002/0122862 | A1 | * | 9/2002 | Zohoungbogbo ............. 426/549 |
| 2002/0146485 | A1 | * | 10/2002 | Oh et al. .......................... 426/57 |
| 2005/0089623 | A1 | * | 4/2005 | Fannon ......................... 426/656 |
| 2005/0202143 | A1 | * | 9/2005 | Roy et al. ..................... 426/549 |
| 2008/0102165 | A1 |   | 5/2008 | Ning et al. |

OTHER PUBLICATIONS

Extruding and Drying of Pasta NPI, HandBook of Food science Technology, and Engineering, vol. 4, E. Castell-Perez, 2006, CRC Press.*
"Nutrition and Athletic Performance", Medicine & Science in Sports & Exercise, Copyright 2000 by the American College of Sports Medicine, pp. 2130-2145.
Complications of Obesity: "Systematic review of randomized controlled trails of low-carbohydrate vs. low-fat/low-calorie diets in the management of obesity and its comorbidities", Hession et al., 2008 Int. Assoc. for the Study of Obesity, pp. 1-15.
The Emerging Role of Dairy Proteins and Bioactive Peptides in Nutrition and Health: "Dietary Protein Impact on Glycemic Control during Weight Loss", Layman et al., 2004 American Society for Nutritional Services, pp. 968S-973S.
"Obesity Trends among U.S. Adults", Citations, Slides 1-28 (text version).
"Protein and Older Adults", Chernoff, Journal of the American College of Nutrition, vol. 23, No. 6, pp. 627S-630S, Jun. 30, 2004.
"Food patterns and cardiovascular disease risk factors: The Swedish INTERGENE research program", Berg et al., 2008 American Society of Nutrition, pp. 289-297.
Stroke:"Primary Prevention of Stroke by Healthy Lifestyle", Chiuve et al., 2008 American Heart Association, Inc., pp. 947-954, Aug. 2008.
"High-Protein, Low-Fat Diets are Effective for Weight Loss and Favorably Alter Biomarkers in Healthy Adults", Johnston et al., 2004 American Society for Nutritional Sciences, pp. 586-591.
Criteria and Significance of Dietary Protein Sources in Humans: "The Protein Digestibility-Corrected Amino Acid Score", Schaafsma, 2000 American Society for Nutritional Sciences, pp. 1865S-1867S.
"Effect of an energy-restricted, high-protein, low-fat diet relative to a conventional high-carbohydrate, low-fat diet on weight loss, body composition, nutritional status, and markers of cardiovascular health in obese women", Noakes et al., 2005 American Society of Clinical Nutrition, pp. 1298-1306.
"3-Evaluation of the Nutritional Value of Proteins", 3-1-3-3-4, Source: RENNER [1983].
"Influence of Protein Level and Starch Type of an Extrusion-Expanded Whey Product"; Allen et al., International Journal of Food Science and Technology 2007, 42, pp. 953-960.
"Texture—Structure Relationships in Texturized Soy Protein II. Textural Properties and Ultrastructure of an Extruded Soybean Product"; Cumming et al., J. Inst. Can. Sci. Technol. Aliment. vol. 5, No. 3, 1972, pp. 124-128.

(Continued)

*Primary Examiner* — Katherine D Leblanc
(74) *Attorney, Agent, or Firm* — Frost Brown Todd LLC; Nicole M. Tepe

(57) ABSTRACT

An expanded extruded high protein product comprising an extrudate of a composition comprising about 10-50% by dry weight of egg white and about 50-90% by dry weight of an edible starch, wherein the product has a moisture content of less than 8%, a protein content of at least 10%, and a density of less than 100 grams per liter.

17 Claims, No Drawings

(56) References Cited

OTHER PUBLICATIONS

"High Temperature Short-Time Extrusion Cooking of Wheat Starch and Flour. I. Effect of Moisture and Flour Type on Extrudate Properties"; Faubion et al., 1982 American Association of Cereal Chemists, Inc., vol. 59, No. 6, 1982, pp. 529-533.

Centers for Disease Control and Prevention, Overweight and Obesity, Health Consequences, Sep. 21, 2008 downloaded from http://cdc.gov/nccdphp/dnpa/obesity/consequences.htm, 2 pgs.

USDA National Nutrient Database for Standard Reference, 2008, downloaded from http://www.nal.usda.gov/fnic/foodcomp/cgi-bin/list_nut_edit.pl, 1 pg.

U.S. Appl. No. 12/226,531, filed Oct. 21, 2008, by Katz, entitled: Egg Proiein Product, now abandoned.

\* cited by examiner

EGG PROTEIN PRODUCT

This application is a Continuation-In-Part of International Application No. PCT/CA2007/001961, filed 1 Nov. 2007, which designated the U.S. and claims priority of CA 2,566,763, filed 1 Nov. 2006, and this application is also a continuation-in-part (CIP) of U.S. application Ser. No. 12/226,531, filed Oct. 21, 2008, the entire contents of each of which are all hereby incorporated herein by reference.

This invention relates to food and in particular to a versatile and healthy expanded extruded food product made from egg white.

BACKGROUND

Increasing awareness of association between diet and health has increased opportunities for food industry to develop novel health foods. Snacks and cereals are popular foods but are associated with negative ingredients (too much salt, very high amounts of carbohydrates, saturated and trans fats, etc.). Food formulators are looking to modify the formulations of these food products with the objectives to improve nutritional value without sacrificing the taste and texture of the product.

Recent research has confirmed association of diet to chronic diseases (heart disease, diabetes, cancer, arthritis, and other inflammatory conditions like inflammatory bowel disease, colitis, psoriasis, etc,) (Berg et al. 2008, *Am J Clin Nutr.* 88(2):289-97; Hession et al. 2008. Obes Review, August; Chiuve et al. 2008, *Circulation.* 118(9):947-54). As a result, more and more people are looking for healthy diets. This situation has created opportunities for food industry to develop healthy products. Regulatory changes permitting health claims also support development and marketing of health food products.

Obesity is a growing problem in all developed countries. In USA, according to Center for Disease Control (http://www.cdc.gov/nccdphp/dnpa/obesity/trend/maps/) only Colorado had a prevalence of obesity less than 20%, rest all the states had a prevalence equal to or greater than 25%, Obese and overweight individuals are at increased risk for many diseases and health conditions, including hypertension, osteoarthritis, dyslipidemia, Type 2 diabetes, coronary heart disease, stroke and some cancers like endometrial, breast, and colon (http://www.cdc.gov/nccdphp/dnpa/obesity/consequences.htm)

Many studies have revealed that diet rich in protein is associated with reducing the weight in obese and overweight people (Johnston C S, Tjonn S L, Swan P D. High-protein, low-fat diets are effective for weight loss and favorably alter biomarkers in healthy adults. J Nutr 2004; 134:586-91; Layman D K, Baum J I. Dietary protein impact on glycemic control during weight loss. J Nutr 2004; 134:968 S-73S; Noakes M, Keogh J B, Foster P R, Clifton P M. Effect of an energy-restricted, highprotein, low-fat diet relative to a conventional high-carbohydrate, low-fat diet on weight loss, body composition, nutritional status, and markers of cardiovascular health in obese women. Am J Clin Nutr 2005; 81:1298-306). High protein diet also helps in endurance athletes to improve their performance and stamina (Joint Position Statement: nutrition and athletic performance. American College of Sports Medicine, American Dietetic Association, and Dietitians of Canada. Med Sci Sports Exerc 2000; 32:2130-45).

Making foods with nutritional ingredients often affects the taste and mouthfeel negatively and hence, consumers often do not accept these products, preferring the less healthy conventional foods, as people do not want to sacrifice on taste and convenience. This leads to challenges to food formulators.

North American and European people obtain their protein requirements mainly from meats. Though providing high quality protein, meat is also rich in saturated and trans fats and other undesirable compounds. Many constituents in meat rich diets are associated with chronic diseases like heart disease and cancer. As a result, more and more people are choosing vegetarian diets. Though vegetarian diets are healthy, plant protein is generally poor in quality compared to animal protein.

Generally, protein rich food products in the market are made with vegetable proteins, of which soy protein is the most commonly used. Vegetable proteins have disadvantages, including poor protein quality and digestibility and they also contribute negatively to taste and flavor of the food product prepared with them. As a result, foods prepared exclusively with vegetable proteins require a significant effort in taste masking. This deficiency of plant based protein restricts their acceptability in consumers.

Commercial snack products are mainly prepared by extrusion technology. The high protein snack products can be puffed or non-puffed. High protein puffed products are well known (U.S. Pat. No. 3,814,824, inventor Bednek et al.; U.S. Pat. No. 4,418,086 inventor Marino et al.). These products suffer from disadvantages of poor organoleptic properties and hence did not find consumer acceptance. U.S. Pat. No. 4,418,086 teaches us the method of making expanded textured protein product by employing meat as a major protein source, in combination with soy flour and other ingredients. According to this teaching (U.S. Pat. No. 4,418,086), expanded textured protein product manufacturing required a mixture of proteinaceous material, animal or vegetable fat, extrusion agent, sulfur or sulfur compounds and plasticizers.

Prior art teaches us methods of making high protein puffed food products by mainly utilizing soy and/or whey protein isolate (Allen et al. U.S. Pat. No. 7,235,276, Jun. 26, 2007). This patent provides for a composition high in protein and dietary fiber. In this patent, soy protein isolate must be combined with whey protein isolate to get the desired functionality. Additionally, to make a ready to eat puffed product many other ingredients must be added. This U.S. Pat. No. 7,235,276 patent also mentions the use of egg albumin or egg white, but only as a small part of total protein.

Protein can be obtained from animal or vegetable sources. It is well known that all proteins are not alike. Proteins from different sources have different properties that affect the quality of protein. The quality of protein can be determined by a series of tests including Protein Efficiency ratio (PER), digestibility, biological value (BV), percent amino acid score (AAS %), and protein digestibility corrected amino acid score (PDCAAS). As shown in the table below, egg protein is superior to vegetable proteins in most areas (taken from Gertjan Schaafsma, The Protein Digestibility-Corrected Amino Acid Score J. Nutr. 130: 1865S-1867S, 2000 and http://www.danone-institute.be/communication/pdf/mono04/mono4-part3.pdf).

| Nutritional Qualities of Selected Proteins | | | | | |
|---|---|---|---|---|---|
| Protein | PER | Digestibility | AAS (%) | Biological value (%) | Net Protein Utilization | PDCAAS |
| Egg | 3.8 | 98 | 121 | 100 | 94 | 118 |
| Cow's milk | 3.1 | 95 | 127 | 91 | 82 | 121 |

-continued

Nutritional Qualities of Selected Proteins

| Protein | PER | Digestibility | AAS (%) | Biological value (%) | Net Protein Utilization | PDCAAS |
|---|---|---|---|---|---|---|
| Beef | 2.9 | 98 | 94 | 77 | 76 | 92 |
| Soy | 2.1 | 95 | 96 | 74 | 61 | 91 |
| Wheat | 1.5 | 91 | 47 | 54 | 41 | 42 |

Egg white offers the advantage of being free from cholesterol, saturated and trans fats and is very high in protein (about 80% on dry weight basis, http://www.nal.usda.gov/fnic/foodcomp/cgi-bin/list_nut_edit.pl.). Egg protein is widely considered the highest nutritional quality protein of all food sources, providing all the essential amino acids in amounts that closely match human requirements and is therefore a standard against which all other proteins are evaluated (Chernoff R. Protein and Older Adults. Journal of the American College of Nutrition. 2004; 23:627S-630S).

Egg protein thus offers considerable nutritive benefits. Eggs in general and egg white in particular also have very little flavor, and thus do not negatively impact the organoleptic properties of foods, and hence eliminates/reduces the requirements for masking flavors. In spite of these obvious benefits the prior art does not use egg whites as a major protein ingredient.

As discussed above, the U.S. Pat. No. 7,235,276 patent mentions the possible use of egg albumin only as a small part of total protein, but does not teach the effect of addition of egg protein on functionality of the prepared food, nor does it mentions the range to which egg protein may be added and what purpose/functionality egg protein will provide in the major blend of soy protein/whey protein isolates. Nowhere are any benefits of egg white over other protein sources mentioned, and it is clearly stated that egg whites are not preferred due to their high cost compared to such materials as soy protein isolate or whey protein isolate.

It is known in the food extrusion industry that high amounts of egg protein inhibit expansion of extruded product and thus makes the texture unacceptable. This characteristic has hampered the use of egg protein as the major source of protein in expanded snack products.

U.S. Pat. No. 5,034,232 (Sugitani et al. Jul. 23, 1991) teaches method of making flavored imitation meat protein material and fried products thereof. In this patent, mainly oil seed protein is used as a source of protein. Egg derivatives including egg white (liquid or dried) is used as a fixative at a concentration of not more than 10%. In this teaching, higher than 10% concentration of egg white negatively affected the product texture. Furthermore, the conditions used to make an acceptable meat texture are not those needed for an expanded/puffed product.

Japanese patent application 03147752 to Muira Tetsuo et al. teaches a method of making puffed food from cheese, powdered milk or egg by adding water and gelatinized starch, making a dough, cutting the dough into thin ribbons, drying the ribbons and then heating in microwave to make a puffed food.

U.S. Pat. No. 4,338,340 to Morimoto et al. (Jul. 6, 1982) teaches a method of making high protein product by extrusion using a heat coagulable protein like egg albumin, blood serum albumin, milk whey protein, etc, In this patent, protein solution is first prepared which is then denatured, dried, and granulated. The granulated denatured protein material is then mixed with other ingredients like starch, alkali sulfide and/or a flavor and then extruded to make the high protein extruded product. Denaturing of protein is achieved by use of heat or denaturing agents like alcohol. Such manufacturing is problematic because use of alcohol as denaturing agent and subsequent drying will necessitate use of explosion proof facility and extra environmental considerations due to evaporation of alcohol during drying. The product so produced is also not expanded to produce the desirable "puffed" characteristics for snack and breakfast foods.

US patent application number 20080102165, May 1, 2008 of Ning et al. teaches a method of producing puffable extruded protein product. In this teaching, though the use of animal protein is mentioned, no examples are shown using animal protein like egg protein. It is well known that all proteins are not alike. Proteins from different sources not only differ in amino acid composition, they also differ in their functional properties (including water holding capacity, emulsifying capacity, foaming capacity, taste, flavor, stability, etc.)

In the prior art applications of various proteins, the egg proteins/animal proteins are used in combination with plant proteins. The prior art applications do not mention the limitations of egg proteins, and it is generally known that egg proteins interfere with expansion, and hence puffing. No commercial product is presently available that uses egg protein as a major or sole source of protein in high protein expanded snacks, as a high proportion of egg whites produces an unsatisfactory product texture.

SUMMARY OF THE INVENTION

It is an object of the present invention to provide an expanded high protein food product derived from eggs that overcomes problems in the prior art.

In a first embodiment the present invention provides an expanded extruded high protein product comprising an extrudate of a composition comprising about 10-50% by dry weight of egg white and about 50-90% by dry weight of an edible starch, wherein the product has a moisture content of less than 8%, a protein content of at least 10%, and a density of less than 100 grams per liter.

In a second embodiment the present invention provides a method for making an expanded extruded high protein product. The method comprises mixing a batter suitable for extrusion by combining about 10-50% by dry weight of egg white and about 50-90% by dry weight of an edible starch, and a liquid; extruding the batter in a twin screw extruder wherein a temperature of a barrel of the extruder is increased from an input end to an discharge die thereof; cutting product exiting the discharge die of the extruder to produce product particles and allowing the product particles to expand.

The present invention discloses expanded extruded high protein products, high in nutritious value and good organoleptic properties such as taste and mouthfeel, and method of production of same. The product can be used as a finished product itself or an ingredient for incorporation into other healthy and nutritious snack and cereals. Product of present invention uses egg white as a major source of protein. The egg white can be either in liquid or dry form. The resultant product can be used for nutritious food products for human and/or pets.

It has been known that high amounts of egg protein inhibit expansion of extruded product and thus makes the texture unacceptable for expanded snack foods and breakfast foods. It is also known that proteins from different sources have different properties that affect the quality of protein. The egg white proteins have an increased occurrence of side chains extending from the amino acids compared to vegetable proteins and these side chains cross link with each other to a greater or lesser extent during processing, depending on moisture, temperature, pressure, and like factors. This increased cross linking is such that egg white cannot be simply substituted for vegetable protein and have a similar product result. Egg white has therefore not been used in high percentages in the prior art as the end product was generally unsatisfactory using processes that were satisfactory when using vegetable protein.

The prior art has not recognized the benefits of egg white protein and has thus not been directed to finding processing parameters which will reduce the cross linking and produce a product with satisfactory organoleptic properties. The processes and examples described below demonstrate that an expanded extruded food product with high levels of egg protein, from 10-40% protein content, and quite acceptable organoleptic properties can be produced quite readily using extrusion technology.

The product of present invention is prepared by mixing egg white in amounts 10% or higher with a source of starch (90% and lower) and conditioner (water). The conditioned mixture is thermoplastically extruded under controlled conditions of temperature and pressure to regulate the degree of expansion.

A leavening agent (carbonate, bicarbonate or phosphate salts of sodium, potassium, calcium, or magnesium, or the like) can be added to enhance expansion. Organic acids can be added to modulate pH and enhance expansion, flavor and taste of the finished product. Flavoring, coloring and sweetening agents can be added to the blend prior to extrusion or to the extruded product. Flavored or unflavored extruded product of present invention can be packed into consumer packs for sale at retail level or added to other snacks or cereals or can be added to pet food formulations and then sold.

Egg whites comprise essentially protein and water, and are readily and commonly separated from the whole eggs for various food uses. The amino acid distribution of egg white protein is about a 90% match to humans. In contrast, soybean protein for example is only about a 45% match. As explained earlier and shown in the table above, egg protein is a high quality protein compared to vegetable proteins. In the present invention egg protein is used as the major source of protein in high protein expanded extruded food products. The high protein food product of the present invention is prepared by:

Mixing egg white with starch
Optionally adding flavouring agents or texture enhancing product like leavening agents and acidulants like food acids to the dry mix
Transferring the dry material to hopper of an extruder (single or twin screw) either after conditioning with water or conditioning is achieved in the extruder itself
Adding a conditioning medium, preferably water, into the extruder
Optionally, mixture can be conditioned outside of extruder
Optionally, acidulant can be dissolved in conditioning medium and added to the dry mix in extruder
Extruding the conditioned mixture under controlled conditions of temperature and pressure
Facilitating expansion of the extruded product
Optionally cooling and drying the expanded extruded product
Optionally coloring and flavouring the dried extruded product.

DETAILED DESCRIPTION

The non-limiting description of a preferred embodiment of the invention is presented below with reference to high protein puffed snack product made from egg whites and the process for making the same. The percentages of the materials indicated below are by weight (dry basis) and the temperatures are in Celsius scale.

The present invention has two main constituents. These include egg white and a starch. Several processing aids can be utilized to enhance the organoleptic properties and/or shelf life of the product of present invention. These are described below.

Protein:

Egg white is selected as the major source of protein in the current invention because egg protein offers best nutritional qualities as mentioned in the table above and its amino acid composition is similar to requirement for human. Egg protein has very high digestibility, and is practically free from objectionable odors and flavors. Egg white in liquid or dry state can be used. Dried egg whites can be manufactured by drum drying, spray drying or freeze drying either prior to using the protein and is commercially available and contains about 80% protein by weight.

The egg white either dried or liquid is used in the present invention and forms between 10-50% of the blend with starch and other ingredients. Preferably, the content of egg protein is between 10-40% and more preferably between 10-35%. It is contemplated that the egg white could be combined with other animal or vegetable proteins like milk proteins (casein, whey protein), soy protein, wheat protein, oil seed proteins. These proteins could be either isolates or concentrates. Isolates are defined when the protein content is 90% or more. When the protein content is less than 90%, then the component is called concentrate.

Starch:

Starch for the present invention forms between 40-90% of the mix. Preferably, starch constitutes between 50-80% and more preferably between 60-80% of the mix. Starch is selected from a group of corn starch, potato starch, cereal flours (wheat, rice, oats, barley, rye, either alone or in combinations thereof). The starches could be native or modified starches. Corn starch is the most preferred starch for the present invention.

Optional Ingredients:

These optional ingredients may be used in making the food product of present invention and include:

Leavening agent:

A leavening agent may be selected from a group of carbonate, or bicarbonate or phosphate salts of sodium, potassium, calcium or magnesium. These agents can be used alone or in combinations thereof. These compounds are used at a level not exceeding 5%, preferably between 0.1-2.0% to improve the expansion and texture of extruded products.

Food acids:

Common food acids can be used either alone or in combination thereof at a level of not more than 10%. The foods acids include but not limited to citric acid, tartaric acid, malic acid, lactic acid, tannic acid, oxalic acid, benzoic acid and butyric acid. It is preferred to use citric or lactic acid at a concentration of 0.01-5.0%.

Salts:

Chloride salts of sodium, potassium, calcium or magnesium can be used either alone or in combinations thereof. The salts are used to improve the taste and flavor of the finished food product. When used, they are added at a concentration between 0-10%, preferably between 0.001-4% of the finished puffed food product.

Sweeteners:

Sweeteners can be optionally added to the formulation of the puffed food product either before extrusion or after extrusion and either before or after drying. Sweetener could be a part of the flavoring/coloring blend that may be applied by spraying/coating the dried food puffed food product. Sweeteners can be natural like sugars (including but not limited to sucrose, maltose, fructose, lactose, etc.), plant extracts like stevia, or synthetic including but not limited to aspartame, sugar alcohol (sorbitol, maltitol, erythritol, etc).

Flavor:

Flavors can optionally be added to the expanded puffed food product of present invention either before extrusion or after extrusion either before or after drying. The flavoring compounds can be the part of the mixture to be extruded or they may be sprinkled as is or coated/sprayed on the dried expanded food product. The technique of applying flavors are well known to people skilled in food processing. The flavors can be slected from synthetic or natural flavors. Organic versions of the flavors can be selected for the organic segment of the market. The flavors are selected from:

Family of fruit flavors (like citrus including but not limited to orange, lemon, and varieties thereof), banana, apple, etc., Tropical fruit flavors, including but not limited to mango, peaches, lychee, kiwi, coconut, khus, etc.

Berry flavors including but not limited to blue berries, strawberries, raspberries, chock cherries, etc.

Floral flavors including but not limited to rose, jasmine, keora, etc.

Spicy flavors including but not limited to anise, caraway, corrainder, turmeric, spearmint, peppermint, dill, peppers, cardamom, green tea, black tea, cinnamon, hickory, etc.

Nutty flavors including but not limited to almond, cashew, peanut, etc.

Dairy flavors like butter, cream, and/or cheese flavors

Other flavors like chocolate, cocoa, caramel, etc.

Synthetic flavors like bubble gum, etc.

The flavors can be an extract, essential oil, oleoresin or fixed oil from different fruits/flowers/seeds, plants or a synthetic version of these flavors mentioned above. The flavors can be used either single or blended flavors. Flavors are added at a concentration of 0.0001-10% of the finished puffed food product. The concentration range of flavor depends on the type of flavor selected, time of addition to the product and also on the flavor choice of targeted consumer segment.

Colors:

Suitable food colors can be added to the finished product or to the blend prior to extruding. The colors include but not limited to natural colors (e.g. turmeric, beet, annatto extract, beta-carotene, grape skin extract, cochineal extract or carmine, paprika oleoresin, caramel color, fruit and vegetable juices, saffron or synthetic food approved colors like FD&C Blue Nos. 1 and 2, FD&C Green No. 3, FD&C Red Nos. 3 and 40, FD&C Yellow Nos. 5 and 6, Orange B, Citrus Red No. 2, Colors are added to enhance the visual appeal of the finished puffed food product. The concentration of colorant used in the formulation is dependent on the legal restrictions, colorant type, concentration of coloring agent and also on the time of addition to the product. Person skilled in the art of food processing understands the technique of coloring.

Preservatives:

Natural or synthetic preservatives may be added to the formulation to enhance the shelf life of the finished product. These preservatives are selected from a list of food approved preservatives in the amounts as governed by regulations or efficiency. The common preservatives are benzoic acid, sorbic acid, lactic acid, butyric acid, gallic acid and derivatives (salts/esters/ethers/or conjugates) thereof, butylated hydroxyl anisole (BHA), butylated hydroxyl toluene (BHT), tocopherols, tocotrienols, extracts of herbs including but not limited to rosemary, oregano, etc.

Selection of processing aids is determined based on the process and equipment used for extrusion, form of packaging, intended use, etc. The processing conditions for production of high protein extruded, puffed product of present inversion will depend on the equipment, end product, desired packaging and market positioning. The common steps in processing of present invention include:

(i) preparing a dry blend of protein and starch where protein is mainly egg protein supplied as liquid or dry egg white powder. Other protein sources may be added to the blend. When other protein sources are also used, egg protein constitutes more than 50% of total protein.

(ii) Optionally adding other ingredients like color, flavor, texture and expansion enhancing agents, etc. to the dry mix, (iii) pre-condition the dry materials by adding water into the mixtures to optimum moisture content and/or to control material temperature prior entering the extruder, (iv) thermoplastic extrusion under controlled temperature and pressure to form an extrudate, (v) puffing the extrudate prior to cooling to form an expanded product, (vi) cooling at atmospheric pressure and temperature, (vii) Optionally drying to reduce moisture content and control the texture of the finished product;

(viii) Optionally adding flavor and/or color to the puffed product.

The chemical composition, expansion and functional properties vary depending on composition of ingredients, configuration and process parameters of the extruder. Leavening agent like sodium bicarbonate or calcium bicarbonate may be added to improve the expansion and texture of extruded products.

The physical appearance can be altered through sizing, coloring, and like processes. The physical properties can also be altered by secondary processes such as dwell time, extrusion temperature, screw speed, pressure and drying temperature, etc.

The screw speed of the extruder may vary depending on the extruded mixture formulations and is typically from about 300 to about 800 revolutions per minutes (rpm). Generally, as the screw speed increases, the amount of shear increases and extrudates become less dense. During extrusion, extrudates are conveyed under mechanical pressure in different heating zones prior to pushing through an extrusion die. The temperature of each heating zone is generally exceeds the previous heating zone by about 5° C. to 70° C. Extrudates are heated at 25° C. to 150° C.

The pressure of the last chambers of the extruder barrel is important to the expansion rate and generally operated at between 35 bars to about 250 bars A method for making high protein expanded-extruded egg product comprises:
(a) Preparing a mixture comprising about 10-50% by dry weight of egg white powder, or its equivalent in liquid form, and about 50-90% by weight of an edible starch, and adding water to form a batter or dough;
(b) Thermo plastically extruding the batter under conditions of temperature and pressure such that the batter is melted and cooked to result in an extrudate;
(c) The heated extrudate is forced through a discharge die under high pressure. As a result, extruded products released superheated steam, causing simultaneous expansion to the materials and a porous texture.

EXAMPLES

Following formulations were prepared.

| Formulation 1 | |
|---|---|
| Corn flour | 100% |

| Formulation 2: | |
|---|---|
| Corn flour | 50% |
| Egg white | 50% |

| Formulation 3: | |
|---|---|
| Corn flour | 50% |
| Egg white | 40% |
| Waxy corn starch | 10% |

| Formulation 4 | |
|---|---|
| Corn flour | 50% |
| Egg white | 35% |
| Waxy corn starch | 10% |
| Potato starch | 5% |

| Formulation 5 | |
|---|---|
| Corn flour | 75% |
| Egg white | 25% |

| Formulation 6 | |
|---|---|
| Corn flour | 90% |
| Egg white | 10% |

| Formulation 7 | |
|---|---|
| Corn flour | 80% |
| Egg white | 20% |

| Formulation 8 | |
|---|---|
| Corn flour | 70% |
| Egg white | 30% |

Procedure:

Dry material of each formulation was mixed for 5-25 minutes in Hobert mixer. The mixture was transferred to hopper of twin screw extruder. Formulations 1 to 5 were prepared in Clextral Model EV32 (Clextral SAS, Z.I. de Chazeau, BP 10, 42702 Firminy Cedex, France,) twin screw extruder while formulations 6-8 were prepared in Clextral model EV58. Water was added to the extruder at a rate of 4-7 kg/hour.

Such extruders are generally operated at 300 and 800 revolutions per minute, and for these examples the screw speed was adjusted to 500-600 rpm. Die temperature was maintained between 130-150° C. and the cutter speed was maintained between 1000 to 1500 rpm. Typically these extruders allow for temperature control at different levels along the barrel and to achieve expansion it is generally known that the temperature should be increased from the input end of the barrel to the discharge die thereof. In these examples the temperature of different barrel zones 1 to 5 of extruder was maintained at 50, 90, 110, 130, and 150° C.

The product of formulation 1-5 coming out of die was dried in hot air oven at a temperature of 160-195° C. for 2-6 minutes to a moisture content of 2-6%. From the results of experiments mentioned above we unexpectedly found that up to 50% egg white addition to corn starch resulted in expanded product, suitable for snack applications while the egg protein concentration higher than 50% produce the products with poor expansion. For cheesy or popcorn type texture, up to 40% egg white was found suitable. The density of all products varied from 47 to about 100 grams per litre.

In another series of experiments, we replaced egg white with whole eggs in same concentrations. The resultant product was more dense and expanded poorly compared to products made using egg white in same concentrations.

Another series of experiments was conducted to study the effect of lavening agent and food acid on the formulation. The experiments are outlined below:

| Formulation Code | Composition | | | |
|---|---|---|---|---|
| | Egg white | Corn flour | Citric acid | Sodium bicarbonate |
| E30408-1 | 40.00% | 60.00% | | |
| E30408-2 | 40.00% | 59.50% | 0.50% | |
| E30408-3 | 40.00% | 58.00% | 2.00% | |
| E30408-4 | 40.00% | 58.00% | | 2.00% |
| E30408-5 | 40.00% | 56.00% | 2.00% | 2.00% |
| E32028-1 | 35.00% | 65.00% | | |
| E32028-2 | 35.00% | 64.75% | | 0.25% |
| E32028-3 | 35.00% | 64.50% | | 0.50% |
| E32028-4 | 35.00% | 64.00% | | 1.00% |
| E32028-5 | 35.00% | 64.50% | 0.50% | |
| E32028-6 | 35.00% | 63.50% | 0.50% | 1.00% |
| E32028-7 | 35.00% | 64.00% | 0.50% | 0.50% |
| E32028-8 | 35.00% | 63.75% | 0.25% | 1.00% |

The dry ingredients were mixed in a hobert mixer for 5-20 minutes. The dry mix was transferred to the hopper of the twin screw extruder. Water was injected into the barrel of extruder and the temperature was maintained between 50 and 175° C. and the pressure was between 5-250 bar. The material extruding through the die was cut and dried in oven at 70-90° C. for 1-3 minutes.

The products obtained in the above series of experiments had crunchy, crispy taste with nice mouth feel and organoleptic properties. Batch number E30408-3 had sour taste and was comparatively denser than other products.

This series of experiments suggested that levels of leavening agent and food acid can be adjusted to obtain the product of desired mouthfeel, texture and shape. The product could be coated/sprinked with various flavors to further improve the organoleptic properties.

Other starches could be combined with the egg whites as well in varying proportions to form suitable expanded egg protein products. It is contemplated that other food grade protein source material could be added to egg white powder. The expanded egg protein product is versatile and has a wide range of food applications. It is contemplated that flavoring and other treatments known in the art can be applied to the product to produce a wide variety of foods including snack foods e.g. chips, crackers, and breakfast cereals.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An expanded food product comprising an extrudate of a composition comprising:
    about 25-50% by dry weight of egg white comprising egg protein; and
    about 50-75% by dry weight of an edible starch;
    wherein the expanded food product has a moisture content of less than 8%, a protein content of at least 30%, and a density of less than 90 grams per liter, and
    wherein egg protein constitutes more than 50% of total protein in the product.

2. The product of claim 1 comprising an extrudate of a composition comprising about 25-40% by weight of egg white and about 60-75% by weight of an edible starch, wherein the product has a protein content of at least 30%.

3. The product of claim 2 comprising an extrudate of a composition comprising about 25-35% by weight of egg white and about 65-75% by weight of an edible starch, wherein the product has a protein content of at least 30%.

4. The product of claim 1 wherein the composition comprises a food grade protein source in addition to egg protein, said protein source constitutes less than 50% of total protein in the product.

5. The product of claim 1 wherein the product has a density of less than 50 grams per liter.

6. A method for making an expanded food product, the method comprising:
    mixing a batter suitable for extrusion by combining about 25-50% by dry weight of egg white and about 50-75% by dry weight of an edible starch, and a liquid, the batter having a protein content of at least 30%, wherein egg protein constitutes more than 50% of the protein;
    mixing a leavening agent into the batter at a dry weight of 0.01%-5%;
    mixing a food acid into the batter at a dry weight of 0.01%-3.80%;
    extruding the batter in an extruder wherein a temperature of a barrel of the extruder is increased from an input end to a discharge die thereof, wherein the temperature of the barrel of the extruder is increased from about 40° C. at the input end to about 175° C. at the discharge die;
    operating the extruder at a screw speed of between 300 and 800 revolutions per minute (rpm); and
    cutting product exiting the discharge die of the extruder to produce product particles of desired size and allowing the product particles to expand until the product particles have a density of less than 90 grams per liter.

7. The method of claim 6 wherein the batter comprises about 25-40% by dry weight of egg white and about 60-75% by dry weight of an edible starch.

8. The method of claim 7 wherein the batter comprises about 25-35% by dry weight of egg white and about 65-75% by dry weight of an edible starch.

9. The method of claim 6 wherein dry components of the batter are mixed together and then fed into the extruder, and liquid is added in the extruder to form the batter.

10. The method of claim 6 further comprising drying the product coming out of the extruder to a moisture content of less than 7%.

11. The method of claim 6 comprising operating the extruder at a screw speed of between 500 and 600 rpm.

12. The method of claim 6 wherein liquid egg white is used to provide the egg white and at least a portion of the liquid.

13. The method of claim 6 wherein the edible starch comprises at least one of rice flour, rice starch, pea starch, pea flour, corn starch, corn flour, wheat flour and wheat starch.

14. The method of claim 6 wherein the leavening agent is selected from the group consisting of carbonates, sodium bicarbonate, sodium phosphate, potassium phosphate, and calcium phosphate.

15. The method of claim 6 wherein the food acid is selected from a group consisting of citric acid, tartaric acid, malic acid, lactic acid, tannic acid, oxalic acid, benzoic acid and butyric acid.

16. The method of claim 6 comprising mixing one of a food color and a food flavor into the batter.

17. The method of claim 6 wherein the product particles have a density of less than 50 grams per liter.

* * * * *